United States Patent [19]

Morén

[11] Patent Number: 4,557,609
[45] Date of Patent: Dec. 10, 1985

[54] ROTARY DRILL BIT

[75] Inventor: Rolf R. Morén, Sandviken, Sweden

[73] Assignee: Santrade Ltd., Lucerne, Switzerland

[21] Appl. No.: 247,216

[22] Filed: Mar. 24, 1981

[30] Foreign Application Priority Data

Apr. 17, 1980 [SE] Sweden .................................. 8002882

[51] Int. Cl.[4] .......................... F16C 33/78; E21B 9/35
[52] U.S. Cl. ...................................... 384/94; 175/372; 277/228
[58] Field of Search ....................... 308/8.2, 36.1, 36.2, 308/187.1; 277/228, 165; 175/371, 372

[56] References Cited

U.S. PATENT DOCUMENTS

| | | | |
|---|---|---|---|
| 2,717,025 | 9/1955 | Jelinek | 277/228 X |
| 2,868,575 | 1/1959 | Hawxhurst | 277/228 X |
| 3,097,893 | 7/1963 | White | 308/36.2 |
| 3,322,433 | 5/1967 | Rentschler | 277/228 |
| 3,397,928 | 8/1968 | Galle | |
| 3,467,448 | 9/1969 | Galle | 308/8.2 |
| 3,604,523 | 9/1971 | Lichte | 308/8.2 |
| 3,761,145 | 9/1973 | Schumacher, Jr. | 308/8.2 |
| 3,848,880 | 11/1974 | Tanner | |
| 3,866,987 | 2/1975 | Garner | |
| 4,167,219 | 9/1979 | McQueen | 175/372 X |
| 4,168,868 | 9/1979 | Shields | 308/8.2 |
| 4,200,343 | 4/1980 | Highsmith | 308/187.1 X |
| 4,306,727 | 12/1981 | Deane et al. | 308/8.2 X |

FOREIGN PATENT DOCUMENTS 2503807  7/1975  Fed. Rep. of Germany .

OTHER PUBLICATIONS

"Slipper Seals: O-Rings with TEFLON for Low Wear", R. E. Huffman, *The Journal of Teflon*, vol. 5, No. 4, May 1964, p. 7.

Primary Examiner—Stuart S. Levy
Assistant Examiner—Daniel P. Stodola
Attorney, Agent, or Firm—Burns, Doane, Swecker & Mathis

[57] ABSTRACT

A sealed rotary drill bit comprising at least one rotatably carried roller cutter (13) and provided with a seal between the cutter and a mounting head (22) for preventing lubricating medium from being discharged from the bearing (14, 15, 16, 17, 18) and impurities from entering the bearing. For purposes of decreasing the friction the seal (22) is provided with a low friction material on a portion of the seal which engages the head to promote rotation between the seal and the head. The portion of the seal which engages the roller cutter has a material of higher frictional coefficient to resist relative rotation between the seal and the roller cutter (25).

4 Claims, 3 Drawing Figures

ROTARY DRILL BIT

This invention relates to a rotary drill bit comprising at least one roller cutter which is rotatably carried on a bearing shaft over a bearing system. An annular sealing means is disposed in a gap between the bit head and the roller cutter for sealing the bearing system by dynamic frictional engagement with at least one of the bit head and roller cutter.

In rotary drill bits of this type the sealing means works as a double-acting seal. On the one hand it has to ensure that lubricant supplied to the bearing system from a lubricant reservoir in the drill bit does not escape, and on the other it has to prevent surrounding media in the drill hole from entering into the bearing system.

Further, drill bits of this type are subjected to extreme stresses which cause complex movements of the roller cutter relative to the bit head. These movements, which increase when wear of the bearing means takes place, comprise a component which is directed along the rotational axis of the roller cutter and a wobbling movement of the roller cutter relative to the bearing shaft, and cause high contact pressure at the sealing surface against the roller cutter and/or the bit head. A high contact pressure in its turn produces high generation and rapid wear of the sealing means.

The object of the present invention is to provide a rotary drill bit between the friction between the mutually movable sealing surfaces on the drill bit and the sealing means is low. Since sealing means of the O-ring type are frequently used in sealed rotary drill bits the object of the invention is especially to decrease the friction in this type of sealing means.

The above and other objects are attained by giving the invention the characterizing features stated in the appending claims.

The invention is described in detail in the following description with reference to the accompanying drawings in which one embodiment is shown by way of example. It is to be understood that this embodiment is only illustrative of the invention and that various modifications thereof may be made within the scope of the claims.

Figure 1:
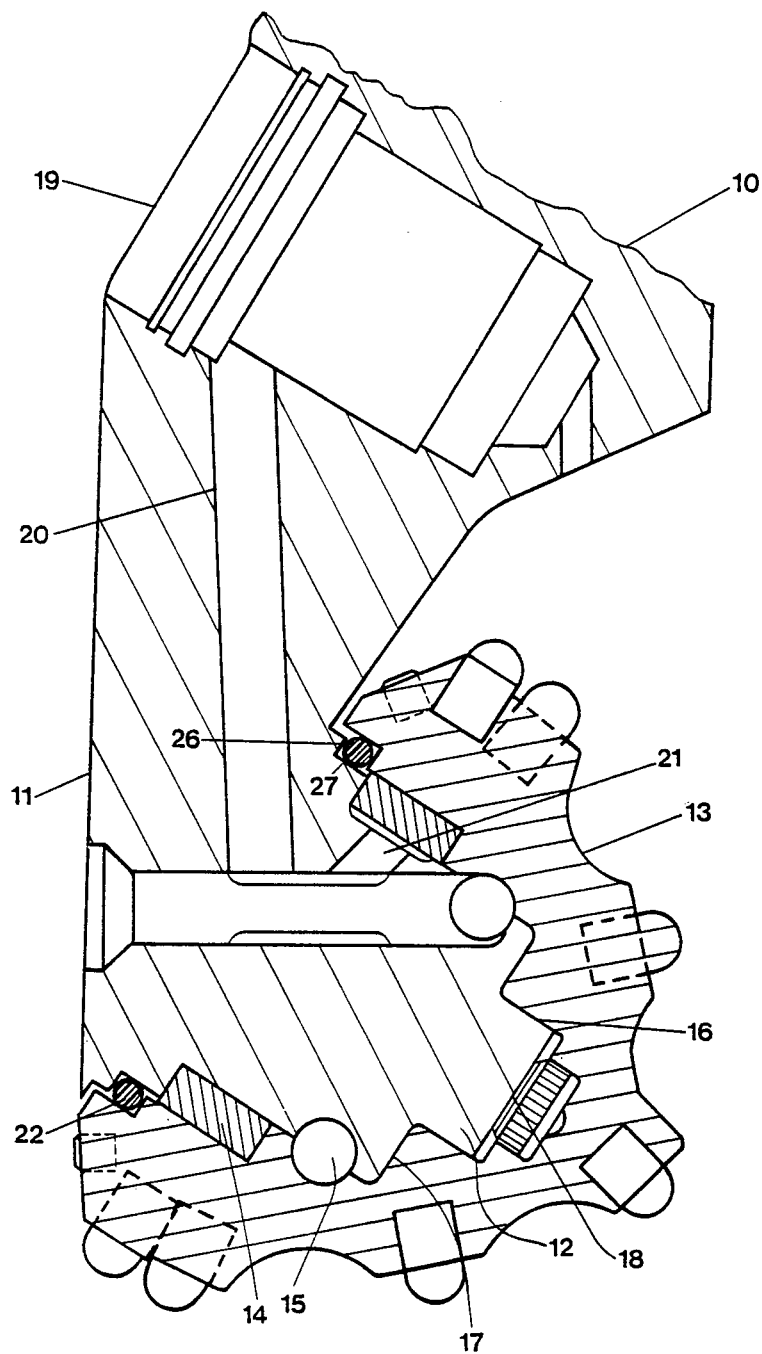
FIG. 1 shows in section one embodiment of a rotary drill according to the invention.

In FIG. 1 the lowermost portion of the head of a roller bit for rotary drilling in rock and earth formations is designated 10. The bit head 10 comprises in conventional manner three separate legs. In FIG. 1 only one leg is shown and designated 11. The lowermost portion of the leg 11 is formed as a bearing shaft 12 upon which a roller cutter 13 provided with cutting means, such as hard metal inserts, is rotatably carried over a bearing system comprising a radial friction bearing 14, a ball bearing 15, a radial friction bearing 16 and axial friction bearings 17, 18.

Lubricant is supplied to the bearing system through passages 20, 21 from a lubricant reservoir 19 in the leg 11. An annular sealing means 22 in form of an O-ring is disposed in a gap between the leg 11 and the roller cutter 13 for sealing the bearing system. The O-ring 22 is movable relative to both the roller cutter 13 and the leg 11. Normally, however, it is desired to prevent relative movement between the O-ring and the roller cutter by making the diameter of the O-ring somewhat larger than the diameter of its seat in the roller cutter.

The O-ring 22 is provided with a sealing surface 23 intended to sealingly engage the leg 11, and a sealing surface 24 intended to sealingly engage the roller cutter 13.

According to the invention the sealing surfaces 23, 24 are provided with mutually different friction coefficient. In the preferred embodiment the sealing surface intended to co-operate with the leg 11 has the lower friction coefficient, i.e. the radially inwardly directed side of the O-ring.

Figure 2:
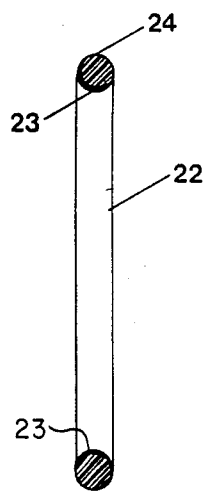
FIG. 2 shows in section one embodiment of a sealing means included in a rotary drill bit according to the invention.
Figure 3:
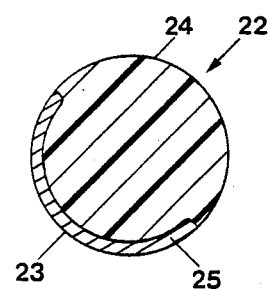
FIG. 3 shows on an enlarged scale a section through the sealing means in FIG. 2.

According to the invention the lower friction coefficient is achieved by applying a friction reducing material 25 in a groove in the O-ring 22; said groove extending about substantially the half the circumference of the O-ring and coherently annularly around the circumference of the O-ring. In the preferred embodiment the friction reducing material is Teflon. The rest of the O-ring consists of rubber or any composite material. As may be seen in FIGS. 2 and 3 the O-ring has a substantially circular cross section when it is dismounted from the roller cutter.

In the preferred embodiment the O-ring 22 seals against a stepped portion on the leg 11. The friction reducing material 25 is then applied on the O-ring in such a way that the material rests against the two cross surfaces 26, 27 on the leg 11.

According to an alternative embodiment the low friction material can be applied on a conventional O-ring, i.e. an O-ring having circular cross section. In this embodiment the low friction material is rolled directly on the radially inward side of the O-ring. If Teflon is used it has been found that this material to some extent penetrates into the pores of the O-ring and that a layer thickness in the order of 0.1 mm is sufficient, which means that the O-ring substantially maintains its circular cross section.

Due to the fact that the low friction material 25 is applied on the radially inwardly directed side of the O-ring 22 it is ensured that relative movement arises only between the O-ring and the leg 11, which has been found to be preferred. As above said such relative movement is normally pursued by making the diameter of the O-ring somewhat larger than the diameter of its seat in the roller cutter, thereby obtaining a press fit of the O-ring in the roller cutter.

Although the invention is described in connection with a sealing means of the O-ring type it is believed that within the inventive concept the sealing surface of other types of sealing means forming a dynamic friction seal could be coated with the low friction material. It is also believed that, if an O-ring is used, the whole outer surface thereof could be coated with the low friction material, since the primary object of the invention is to decrease the friction between the sealing means and the bit head or the roller cutter. As example of other types of sealing means a seal ring having rectangular cross section could be mentioned. If such a sealing ring is used it is preferably secured in an annular groove in the roller cutter 13. Since this sealing ring only seals against a surface corresponding to the surface 27 in FIG. 1 it is only necessary to apply the low friction material on its radially inwardly directed side.

I claim:

1. A rotary drill bit comprising a head, at least one roller cutter, said roller cutter being rotatably carried by said head upon bearing means, an annular resilient sealing means disposed in a gap between said head and roller cutter for sealing said bearing means, said sealing means having a sealing surface for sealingly engaging said head and roller cutter, the improvement wherein a first portion of said sealing surface is formed of a first material attached to the sealing means and positioned at a location for engaging said head and avoiding any appreciable engagement with said roller cutter, said first material being of a thickness thin enough to allow deformation thereof caused by axial and/or wobbling movements of the roller cutter relative to the head, a second portion of said sealing surface frictionally engaging said roller cutter and being formed of a resilient second material having a coefficient of friction higher than that of said first material so that the frictional resistance to relative rotation between said sealing means and said roller cutter is greater than the frictional resistance to relative rotation between said sealing means and said head.

2. A rotary drill bit according to claim 1, wherein said head includes first and second angularly related surfaces, said first portion of said sealing surface is positioned so as to rest against said first and second surfaces of the head.

3. A rotary drill bit according to claim 1, wherein the sealing means comprises an O-ring having a substantially circular cross-section upon being dismounted.

4. A rotary drill bit according to claim 1, wherein said first material is polytetrafluorethylene.

* * * * *